(12) United States Patent
Morimura

(10) Patent No.: US 10,857,939 B2
(45) Date of Patent: Dec. 8, 2020

(54) NOTIFICATION DEVICE

(71) Applicant: Toyota Jidosha Kabushiki Kaisha, Toyota (JP)

(72) Inventor: Junichi Morimura, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/594,511

(22) Filed: Oct. 7, 2019

(65) Prior Publication Data

US 2020/0114816 A1 Apr. 16, 2020

(30) Foreign Application Priority Data

Oct. 10, 2018 (JP) .................................. 2018-191841

(51) Int. Cl.
| | | |
|---|---|---|
| B60Q 1/54 | (2006.01) | |
| B60Q 1/52 | (2006.01) | |
| G08G 1/005 | (2006.01) | |
| B60Q 5/00 | (2006.01) | |
| G08G 1/16 | (2006.01) | |

(52) U.S. Cl.
CPC .............. B60Q 1/525 (2013.01); B60Q 5/005 (2013.01); G08G 1/005 (2013.01); G08G 1/166 (2013.01)

(58) Field of Classification Search
CPC ........... B60Q 1/525; B60Q 1/506; B60Q 1/54
USPC ........................................................ 340/463
See application file for complete search history.

(56) References Cited

U.S. PATENT DOCUMENTS

| | | | | |
|---|---|---|---|---|
| 3,162,338 A | * | 12/1964 | Grubelic | ........... B01F 15/00681 222/484 |
| 3,196,164 A | * | 7/1965 | Armistead | ........... C07D 493/04 549/298 |
| 9,196,164 B1 | | 11/2015 | Urmson et al. | |
| 2008/0165018 A1 | * | 7/2008 | Breed | ..................... G08G 1/161 340/573.1 |
| 2015/0094878 A1 | * | 4/2015 | Miura | ................... B60W 50/14 701/1 |

FOREIGN PATENT DOCUMENTS

| | | |
|---|---|---|
| JP | 2009-059200 A | 3/2009 |
| JP | 3162338 U | 8/2010 |
| JP | 2015-072570 A | 4/2015 |

* cited by examiner

Primary Examiner — Qutbuddin Ghulamali
(74) Attorney, Agent, or Firm — Dinsmore & Shohl LLP

(57) ABSTRACT

A notification device includes a calculation unit calculating, based on a speed of a vehicle, a vehicle stoppage distance by which the vehicle travels until the vehicle enters a stopped state while performing autonomous driving, a notification unit performing notification about information with respect to an outside of the vehicle, and a notification controller causing the notification unit not to perform notification about information indicating that the vehicle is in the middle of deceleration until the vehicle passes by a first soon-to-cross pedestrian and to cause the notification unit to perform notification about the information after the vehicle passes by the first soon-to-cross pedestrian when a distance between the vehicle and the first soon-to-cross pedestrian is smaller than the vehicle stoppage distance and a distance between the vehicle and a second soon-to-cross pedestrian is equal to or greater than the vehicle stoppage distance.

4 Claims, 8 Drawing Sheets

NOTIFICATION DEVICE

CROSS-REFERENCE TO RELATED APPLICATION

This application is based on Japanese Patent Application No. 2018-191841 filed with Japan Patent Office on Oct. 10, 2018, the entire contents of which are hereby incorporated by reference.

TECHNICAL FIELD

The present disclosure relates to a notification device.

BACKGROUND

U.S. Pat. No. 9,196,164 discloses a vehicle performing autonomous driving. When a determination is made that a pedestrian may cross the trajectory of the vehicle, the vehicle notifies the pedestrian of a current or future behavior of the host vehicle by using a language, light, a sound, or the like.

SUMMARY

In the case of the device described in U.S. Pat. No. 9,196,164, when there is a plurality of pedestrians determined as pedestrians who may cross the trajectory, there is a possibility that the pedestrians cannot be appropriately notified of the behavior of the vehicle. For example, there is a case where the vehicle detects a first pedestrian and a second pedestrian positioned further than the first pedestrian and the vehicle stops at the position of the second pedestrian after passing through the position of the first pedestrian while decelerating. When the vehicle performs notification about the deceleration while starting the deceleration at this time, the first pedestrian may erroneously recognize that the vehicle will stop in front of the first pedestrian.

The present disclosure provides a notification device that can perform notification without confusing a plurality of pedestrians.

An aspect of the present disclosure relates to a notification device configured to provide in a vehicle performing autonomous driving and configured to notify pedestrians of information. The notification device includes a recognition unit, a determination unit, a calculation unit, a notification unit, and a notification controller. The recognition unit is configured to recognize, based on a result of detection performed by an external sensor, positions of the pedestrians in front of a roadway on which the vehicle travels. The determination unit is configured to determine, based on a distance between the positions of the pedestrians recognized by the recognition unit and the road on which the vehicle travels, whether the pedestrians are soon-to-cross pedestrians. The calculation unit is configured to calculate, based on a speed of the vehicle during autonomous driving, a vehicle stoppage distance by which the vehicle travels until the vehicle enters the stopped state while performing autonomous driving when the determination unit determines that the pedestrians are the soon-to-cross pedestrians. The notification unit is provided in the vehicle and is configured to perform notification about the information with respect to an outside of the vehicle. The notification controller is configured to determine the information based on the vehicle stoppage distance calculated by the calculation unit, the position of the vehicle, and the positions of the soon-to-cross pedestrians and to cause the notification unit to perform notification about the determined information. The soon-to-cross pedestrians include a first soon-to-cross pedestrian and a second soon-to-cross pedestrian positioned ahead of the first soon-to-cross pedestrian in a proceeding direction of the vehicle. The notification controller is configured to cause the notification unit not to perform notification about information indicating that the vehicle is in the middle of deceleration until the vehicle passes by the first soon-to-cross pedestrian and to cause the notification unit to perform notification about information indicating that the vehicle is in the middle of deceleration after the vehicle passes by the first soon-to-cross pedestrian when a distance between the vehicle and the first soon-to-cross pedestrian is smaller than the vehicle stoppage distance and a distance between the vehicle and the second soon-to-cross pedestrian is equal to or greater than the vehicle stoppage distance.

In the case of the notification device, when the distance between the vehicle and the first soon-to-cross pedestrian is smaller than the vehicle stoppage distance and the distance between the vehicle and the second soon-to-cross pedestrian is equal to or greater than the vehicle stoppage distance, notification about the information indicating that the vehicle is in the middle of deceleration is not performed with respect to the outside of the vehicle until the vehicle passes by the first soon-to-cross pedestrian and notification about the information indicating that the vehicle is in the middle of deceleration is performed with respect to the outside of the vehicle after the vehicle passes by the first soon-to-cross pedestrian. As described above, the vehicle do not start notification about the information indicating that the vehicle is in the middle of deceleration at a position in front of the first soon-to-cross pedestrian at which the vehicle will not stop. Therefore, the first soon-to-cross pedestrian can avoid erroneously recognizing that the vehicle will stop in front of the first soon-to-cross pedestrian. In addition, after the vehicle passes by the first soon-to-cross pedestrian, notification about the information indicating that the vehicle is in the middle of deceleration is performed. Therefore, correct information indicating that the vehicle will stop in front of the second soon-to-cross pedestrian can be appropriately provided to the second soon-to-cross pedestrian. Accordingly, with the notification device, it is possible to perform notification without confusing any one of the first soon-to-cross pedestrian and the second soon-to-cross pedestrian.

In the notification device according to the aspect of the disclosure, the notification controller may be configured to cause the notification unit to perform notification about information indicating passage of the vehicle until the vehicle passes by the first soon-to-cross pedestrian. With this configuration, the first soon-to-cross pedestrian who is not notified of the information indicating that the vehicle is in the middle of deceleration in the above-described situation is appropriately notified of a future behavior of the vehicle, that is, a behavior of passing by the first soon-to-cross pedestrian without stopping in front of the first soon-to-cross pedestrian. Therefore, with the notification device, it is possible to avoid confusing the first soon-to-cross pedestrian.

The notification device according to the aspect of the disclosure may further include a vehicle stoppage determination unit configured to determine whether the vehicle is in a stopped state and the notification controller may be configured to change information, about which the notification unit performs notification, from information indicating that the vehicle is in the middle of deceleration to information indicating that the vehicle is in the stopped state when the vehicle stoppage determination unit determines that the vehicle is in the stopped state. With this configuration, it is possible for a pedestrian to clearly distinguish between a state where the vehicle is in the middle of deceleration and a state where the vehicle is in the stopped state.

In the notification device according to the aspect of the disclosure, the notification unit may be configured to display the information as notification about the information and the notification controller may be configured to control a displaying operation of the notification unit. With this configuration, it is possible to perform notification with respect to a pedestrian crossing a road such that the pedestrian can visually recognize the notification.

According to various aspects and embodiments of the present disclosure, it is possible to perform notification without confusing a plurality of pedestrians.

DETAILED DESCRIPTION

Figure 1:
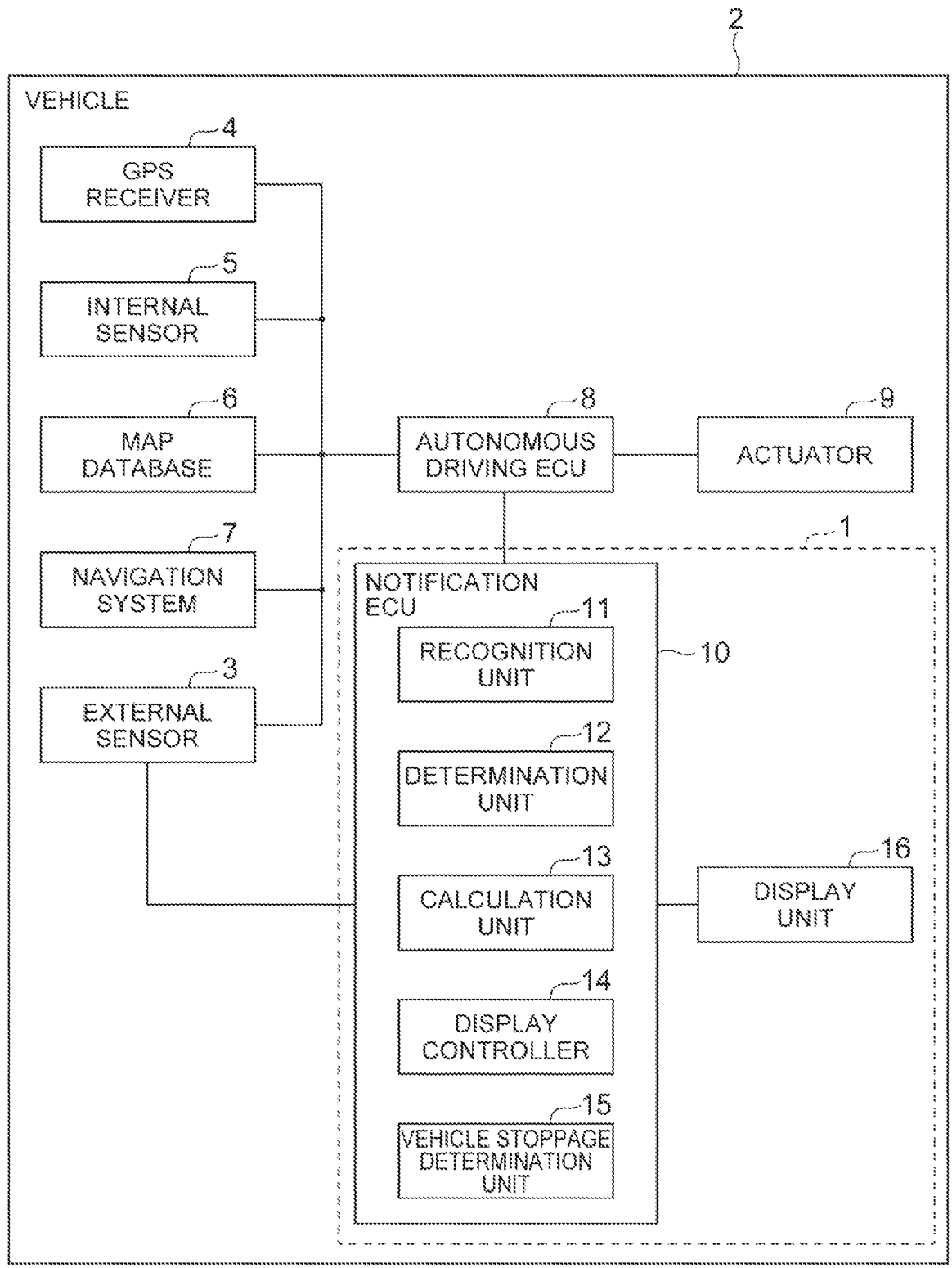
FIG. 1 is a functional block diagram of an example of a vehicle including a notification device according to the embodiment.

Hereinafter, an exemplary embodiment will be described with reference to drawings. In the following description, the same or corresponding elements are given the same reference numerals and repetitive description will be omitted.
Configuration of Vehicle and Notification Device FIG. 1 is a functional block diagram of an example of a vehicle 2 including a notification device 1 according to the embodiment. As illustrated in FIG. 1, in the vehicle 2 such as a passenger car, the notification device 1 is installed. The notification device 1 is provided in the vehicle 2 performing autonomous driving and the notification device 1 notifies a pedestrian of information. Autonomous driving is vehicle control that causes the vehicle 2 to automatically travel to a destination set in advance. The destination may be set by an occupant such as a driver and may be automatically set by the vehicle 2. At the time of the autonomous driving, the driver does not need to perform a driving operation and the vehicle 2 travels automatically.

The vehicle 2 is provided with an external sensor 3, a GPS receiver 4, an internal sensor 5, a map database 6, a navigation system 7, an autonomous driving ECU 8, and an actuator 9.

The external sensor 3 is a detecting machine that detects a situation in the vicinity of the vehicle 2. The external sensor 3 detects the position of an object in front of a roadway on which the vehicle 2 travels. The external sensor 3 includes at least one of a camera and a radar sensor.

The camera is an imaging machine that images a situation outside the vehicle 2. The camera is provided on a rear side of a windshield of the vehicle 2, for example. The camera acquires imaging information related to the situation outside the vehicle 2. The camera may be a monocular camera and may be a stereo camera. The stereo camera includes two imaging units that are disposed such that binocular parallax is realized. Imaging information of the stereo camera includes information in a depth direction also.

The radar sensor is a detecting machine that detects an object in the vicinity of the vehicle 2 by using a radio wave (for example, millimeter wave) or light. Examples of the radar sensor include a millimeter wave radar and a laser imaging detection and ranging (LIDAR). The radar sensor detects an object by transmitting a radio wave or light to the vicinity of the vehicle 2 and receiving the radio wave or light reflected by an obstacle.

The GPS receiver 4 acquires position information indicating the position of the vehicle 2 by receiving signals from three or more GPS satellites. The position information includes latitude and longitude, for example. Instead of the GPS receiver 4, other means capable of specifying the latitude and the longitude of the vehicle 2 may also be used.

The internal sensor 5 is a detecting machine that detects a traveling state of the vehicle 2. The internal sensor 5 includes a vehicle speed sensor, an acceleration sensor, and a yaw rate sensor. The vehicle speed sensor is a measurer that measures the speed of the vehicle 2. As the vehicle speed sensor, for example, a vehicle wheel speed sensor that is provided with respect to vehicle wheels of the vehicle 2 or a drive shaft integrally rotating with the vehicle wheels and that measures the rotation speed of vehicle wheels is used.

The acceleration sensor is a measurer that measures the degree of acceleration of the vehicle 2. The acceleration sensor may include a front-rear acceleration sensor that measures the degree of acceleration of the vehicle 2 in a front-rear direction and a lateral acceleration sensor that measures the degree of acceleration of the vehicle 2. The yaw rate sensor is a measurer that measures the yaw rate (rotary angular speed) around the vertical axis of the center of gravity of the vehicle 2. As the yaw rate sensor, a gyro sensor can be used, for example.

The map database 6 is a storing device that stores map information. The map database 6 is stored in a hard disk drive (HDD) installed in the vehicle 2, for example. The map database 6 includes information of a stationary object, traffic rules, and the positions of traffic lights. The stationary object is, for example, a road surface painting (including lane boundary line such as white line and yellow line) and a structure (such as curb, pole, electric pole, building, sign, and tree). A part of the map information included in the map database 6 may be stored in a storing device different from the HDD in which the map database 6 is stored. A part of or the entire map information included in the map database 6 may be stored in a storing device other than a storing device provided in the vehicle 2.

The navigation system 7 is a system that guides a driver of the vehicle 2 to a destination set in advance. The navigation system 7 recognizes, based on the position of the vehicle 2 measured by the GPS receiver 4 and the map information in the map database 6, a traveling road and a traveling lane on which the vehicle 2 travels. The navigation system 7 calculates a target route from the position of the vehicle 2 to the destination and guides the driver along the target route by using a human machine interface (HMI).

The actuator 9 is a device that performs traveling control of the vehicle 2. The actuator 9 includes at least an engine actuator, a brake actuator, and a steering actuator. The engine actuator controls the drive force of the vehicle 2 by changing the amount of air supplied to an engine (for example, changing throttle opening degree) in accordance with a control signal from the autonomous driving ECU 8. The engine actuator controls the drive force of a motor functioning as a power source when the vehicle 2 is a hybrid vehicle or an electric vehicle.

The autonomous driving ECU 8 controls the vehicle 2. The ECU is an electronic control unit that includes a central processing unit (CPU), a read only memory (ROM), a random access memory (RAM), a controller area network (CAN) communication circuit, or the like. The autonomous driving ECU 8 is connected to a network in which communication is performed by means of the CAN communication circuit and is connected to the above-described constituent elements of the vehicle 2 such that the autonomous driving ECU 8 can communicate with the constituent elements. The autonomous driving ECU 8 realizes an autonomous driving function by operating the CAN communication circuit such that data is input and output, storing the data in the RAM, loading a program stored in the ROM into the RAM, and executing the program loaded into the RAM, based on a signal output by the CPU, for example. The autonomous driving ECU 8 may include a plurality of electronic control units.

The autonomous driving ECU 8 recognizes an object (including position of object) in the vicinity of the vehicle 2 based on at least one of the result of detection performed by the external sensor 3 and the map database 6. Examples of the object include a dynamic object such as a pedestrian, a bicycle, and a non-host vehicle in addition to a stationary object such as an electric pole, a guardrail, a tree, and a building. The autonomous driving ECU 8 performs object recognition each time the result of detection is acquired from the external sensor 3, for example. The autonomous driving ECU 8 may recognize an object by using other known methods.

The autonomous driving ECU 8 detects a dynamic object from recognized objects by using the information of a stationary object included in the map database 6, for example. The autonomous driving ECU 8 may detect the dynamic objects by using other known methods.

The autonomous driving ECU 8 measures the movement quantity of the dynamic object at that time by applying a Kalman filter a particle filter, or the like with respect to the detected dynamic object. The movement quantity includes the movement direction and the movement speed of the dynamic object. The movement quantity may include the rotation speed of the dynamic object. In addition, the autonomous driving ECU 8 may perform movement quantity error estimation.

The autonomous driving ECU 8 recognizes the traveling state of the vehicle 2 based on the result of detection performed by the internal sensor 5 (for example, vehicle speed information of vehicle speed sensor, acceleration information of acceleration sensor, yaw rate information of yaw rate sensor, or like). The traveling state of the vehicle 2 includes, for example, the vehicle speed, the degree of acceleration, and the yaw rate.

The autonomous driving ECU 8 recognizes, based on the result of detection performed by the external sensor 3, boundary lines of a lane on which the vehicle 2 travels.

The autonomous driving ECU 8 generates the course of the vehicle 2 based on the result of detection performed by the external sensor 3, the map database 6, the recognized position of the vehicle 2 in a map, information about a recognized object (including lane boundary lines), and the recognized traveling state of the vehicle 2. At this time, the autonomous driving ECU 8 generates the course of the vehicle 2 while making an assumption about the behavior of an object in the vicinity of the vehicle 2. Examples of the assumption about the behavior of the object include an assumption that all of objects in the vicinity of the vehicle 2 are stationary objects, an assumption that a dynamic object moves independently, and an assumption that a dynamic object moves while interacting with at least one of another object and the vehicle 2.

The autonomous driving ECU 8 generates a plurality of candidates for the course of the vehicle 2 by using a plurality of assumptions. The candidates for the course include at least one course along which the vehicle 2 travels avoiding an object. The autonomous driving ECU 8 selects one course by using the reliabilities of the candidates for the course or the like.

The autonomous driving ECU 8 generates a traveling plan in accordance with the selected course. The autonomous driving ECU 8 generates the traveling plan in accordance with the course of the vehicle 2 based on the result of detection performed by the external sensor 3 and the map database 6. The autonomous driving ECU 8 generates the traveling plan such that the speed limit for a traveling lane is not exceeded by using the speed limit stored in the map database 6. In addition, the autonomous driving ECU 8 generates the traveling plan in which the vehicle 2 travels such that a predetermined upper limit speed is not exceeded.

The autonomous driving ECU 8 outputs the traveling plan to be generated such that the course of the vehicle 2 has a plurality of combinations of two elements, the two elements being a target position p in a coordinate system fixed to the vehicle 2 and a speed V at each target point (that is, plurality of configuration coordinates (p, V)). Here, each target position p includes at least the X and Y coordinates thereof in the coordinate system fixed to the vehicle 2 or information equivalent thereto. Note that, the traveling plan is not particularly limited as long as the traveling plan described the behavior of the vehicle 2. Regarding the traveling plan, a target time t may be used instead of the speed V and the target time t and the orientation of the vehicle 2 at that time may be added to the traveling plan. The traveling plan may be data indicating how the vehicle speed, the degree of acceleration and deceleration, the steering torque, and the like of the vehicle 2 change when the vehicle 2 travels along the course. The traveling plan may include the speed pattern, the pattern of the degree of acceleration and deceleration, and the steering pattern of the vehicle 2.

The autonomous driving ECU 8 automatically controls travel of the vehicle 2 based on the generated traveling plan. The autonomous driving ECU 8 outputs a control signal corresponding to the traveling plan to the actuator 9. In this manner, the autonomous driving ECU 8 controls travel of the vehicle 2 such that the vehicle 2 automatically travels in accordance with the traveling plan.

Hereinafter, autonomous driving that is performed by the autonomous driving ECU 8 is explained when a pedestrian is present in front of a road on which the vehicle 2 travels.

Figure 2A:
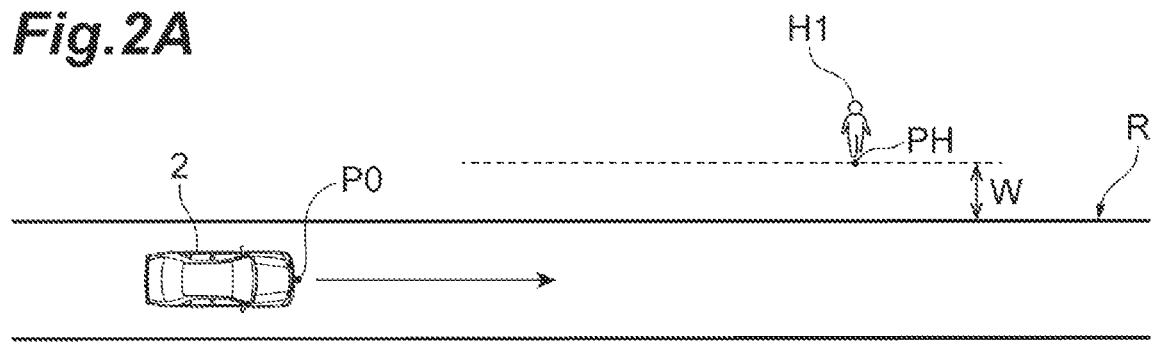
FIG. 2A is an example of the position of a pedestrian.

The autonomous driving ECU 8 recognizes, based on the result of detection performed by the external sensor 3, the position of the pedestrian in front of the roadway on which the vehicle 2 travels. The autonomous driving ECU 8 determines whether an object detected by the external sensor 3 is a pedestrian or not by using a pattern matching technique or the like. FIG. 2A is an example of the position of the pedestrian. In an example shown in FIG. 2A, the vehicle 2 is traveling along a road R. A pedestrian H is present at a position (for example, position ahead of position P0 of vehicle head in proceeding direction) in front of the roadway on which the vehicle 2 travels. The external sensor 3 detects boundary lines of the road R and an object present at a position PH and the autonomous driving ECU 8 recognizes that the object present at the position PH is the pedestrian H.

The autonomous driving ECU 8 determines whether the pedestrian H is a soon-to-cross pedestrian based on a distance between the position PH of the recognized pedestrian H and the road R on which the vehicle 2 travels. The soon-to-cross pedestrian refers to a pedestrian who has an intention to cross a road. In the example shown in FIG. 2A, the pedestrian H is separated from a boundary line of the road R by a distance W. The autonomous driving ECU 8 determines that the pedestrian is the soon-to-cross pedestrian when the distance W is equal to or lower than a threshold value, for example. A determination unit 12 determines that the pedestrian H is not the soon-to-cross pedestrian when the distance W is not equal to or lower than the threshold value, for example. The autonomous driving ECU 8 may determine whether the pedestrian H is the soon-to-cross pedestrian in consideration of a direction in which the face of the pedestrian H faces and a direction in which the pedestrian H moves as well. The autonomous driving ECU 8 determines that the pedestrian is not the soon-to-cross pedestrian when the pedestrian H moves in a direction away from the road R. The autonomous driving ECU 8 may determine whether the pedestrian H is the soon-to-cross pedestrian in consideration of a distance between the pedestrian H and a pedestrian crossing as well.

Figure 2B:
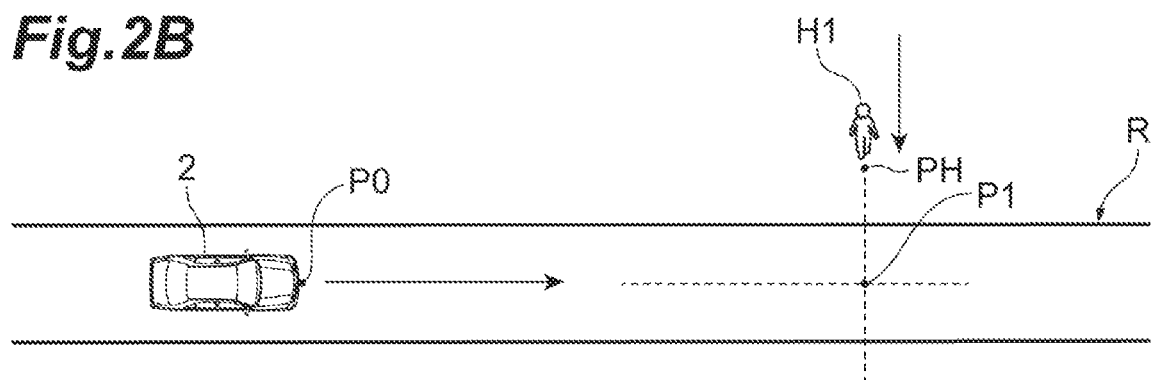
FIG. 2B is an example of a position corresponding to a soon-to-cross pedestrian.
Figure 2C:
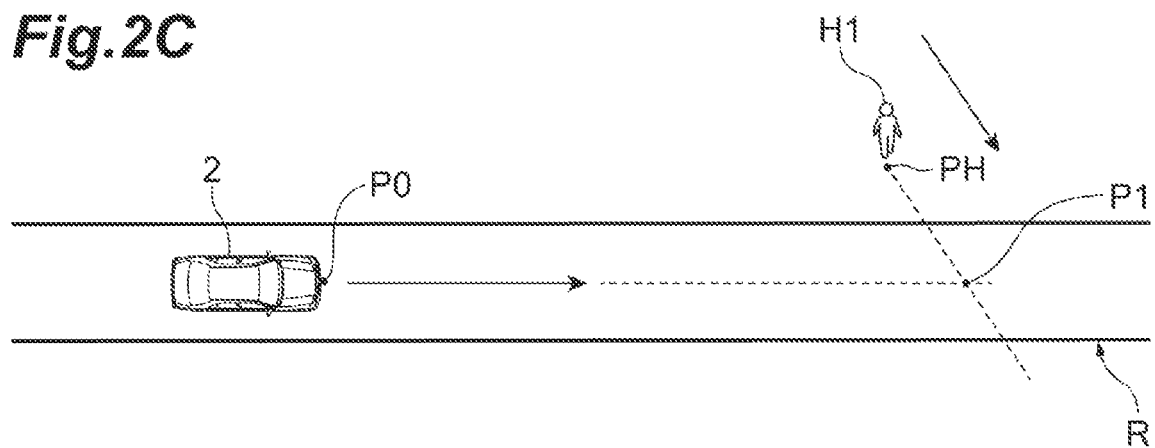
FIG. 2C is another example of the position corresponding to the soon-to-cross pedestrian.

The autonomous driving ECU 8 continues the autonomous driving when the pedestrian H is not the soon-to-cross pedestrian. The autonomous driving ECU 8 determines the position corresponding to the soon-to-cross pedestrian on the road R when the pedestrian H is the soon-to-cross pedestrian. The autonomous driving ECU 8 draws a straight line from the position of the soon-to-cross pedestrian to the course of the vehicle 2 and determines an intersection between the straight line and the course as the position corresponding to the soon-to-cross pedestrian, for example. The position corresponding to the pedestrian is a position on the road that is determined based on the position of the pedestrian and is a position used when a behavior such as stoppage is performed in accordance with the pedestrian at the time of the autonomous driving. The autonomous driving ECU 8 may determine the position corresponding to the soon-to-cross pedestrian in consideration of a direction in which the soon-to-cross pedestrian moves as well. FIG. 2B is an example of the position corresponding to the soon-to-cross pedestrian. In FIG. 2B, a soon-to-cross pedestrian H1 is about to move in a direction orthogonal to the road R. In this case, as shown in FIG. 2B, a straight line extending from the position PH of the soon-to-cross pedestrian H1 in a direction in which the soon-to-cross pedestrian H1 moves is drawn and an intersection between the course of the vehicle 2 and the straight line is determined as a position P1 corresponding to the soon-to-cross pedestrian H1. FIG. 2C is another example of the position corresponding to the soon-to-cross pedestrian. In FIG. 2C, the soon-to-cross pedestrian H1 is about to move in a direction obliquely intersecting the road R. In this case, as shown in FIG. 2C, a straight line extending from the position PH of the soon-to-cross pedestrian H1 in a direction in which the soon-to-cross pedestrian H1 moves is drawn and an intersection between the course of the vehicle 2 and the straight line is determined as the position P corresponding to the soon-to-cross pedestrian H1.

The autonomous driving ECU 8 calculates, based on the speed of the vehicle 2 during autonomous driving, a vehicle stoppage distance by which the vehicle 2 travels until the vehicle 2 enters a stopped state while performing autonomous driving. The stopped state is a state where a determination is made that the vehicle 2 is stopped based on the result of detection of the internal sensor 5. The autonomous driving ECU 8 determines that the vehicle 2 is in the stopped state when the vehicle speed measured by the internal sensor 5 is zero or falls in a predetermined range including zero. That is, the stopped state refers a case where the vehicle 2 is moving such that the vehicle 2 can be regarded as being stopped in addition to a case where the vehicle 2 is completely stopped.

The autonomous driving ECU 8 can calculate, based on the vehicle speed measured by the internal sensor 5 and the braking performance of the vehicle 2, the vehicle stoppage distance by which the vehicle 2 travels from the current position until the vehicle 2 in a traveling state enters the stopped state, for example. The autonomous driving ECU 8 may acquire the braking performance of the vehicle 2 from specification information of the vehicle 2 or may determine a braking force that the vehicle 2 can exhibit in consideration of the current traveling situation of the vehicle 2. For example, when the current traveling situation of the vehicle 2 is a traveling situation in which it is possible to brake quickly, the autonomous driving ECU 8 determines to cause the vehicle 2 to enter the stopped state with a braking force that reaches the upper limit value of the braking performance of the vehicle 2. When the current traveling situation of the vehicle 2 is not a traveling situation in which it is possible to brake quickly, the autonomous driving ECU 8 determines to cause the vehicle 2 to enter the stopped state with a braking force lower than the upper limit value of the braking performance of the vehicle 2 in consideration of a distance between the vehicle 2 and a non-host vehicle, ride quality with respect to an occupant, or the like.

The autonomous driving ECU 8 calculates a pedestrian-to-vehicle distance which is a distance between the position P1 corresponding to the soon-to-cross pedestrian H1 and the current position P0 of the vehicle 2 (for example, position of vehicle head of vehicle 2). When the pedestrian-to-vehicle distance is equal to or greater than the vehicle stoppage distance, the autonomous driving ECU 8 determines that the vehicle 2 can be stopped before the vehicle 2 reaches the position P1. The autonomous driving ECU 8 causes the vehicle 2 to decelerate at a position in front of a position at which the pedestrian-to-vehicle distance is smaller than the vehicle stoppage distance. The autonomous driving ECU 8 determines that the vehicle 2 cannot be stopped before the vehicle 2 reaches the position P1 when the pedestrian-to-vehicle distance is smaller than the vehicle stoppage distance. In this case, the autonomous driving ECU 8 causes the vehicle 2 to pass through the position P1 corresponding to the soon-to-cross pedestrian H1. Note that, when the vehicle 2 is caused to pass through the position P1 corresponding to the soon-to-cross pedestrian H1, the autonomous driving ECU 8 may cause the vehicle 2 to decelerate.

The notification device 1 is provided with a notification ECU 10 and a display unit 16 (example of notification unit). The notification ECU 10 is an electronic control unit that controls notification of information with respect to a pedestrian. The notification ECU 10 may include a plurality of ECUs. The display unit 16 is a machine that is provided in the vehicle 2 and that performs notification of information with respect to the outside of the vehicle. The display unit 16 is connected to the notification ECU 10 and displays information based on an output signal of the notification ECU. The information is information which a pedestrian in a proceeding direction of the vehicle 2 is to be notified of and is information indicating the current traveling state of the vehicle 2, for example. Examples of the traveling state include a traveling continuation state where the vehicle 2 continues to travel, a deceleration state where the vehicle 2 is in the middle of deceleration, the stopped state where the vehicle 2 is stopped, a movement starting state where the vehicle 2 starts to move, and a passage state where the vehicle 2 passes through a position corresponding to a pedestrian, for example.

Figure 3A:
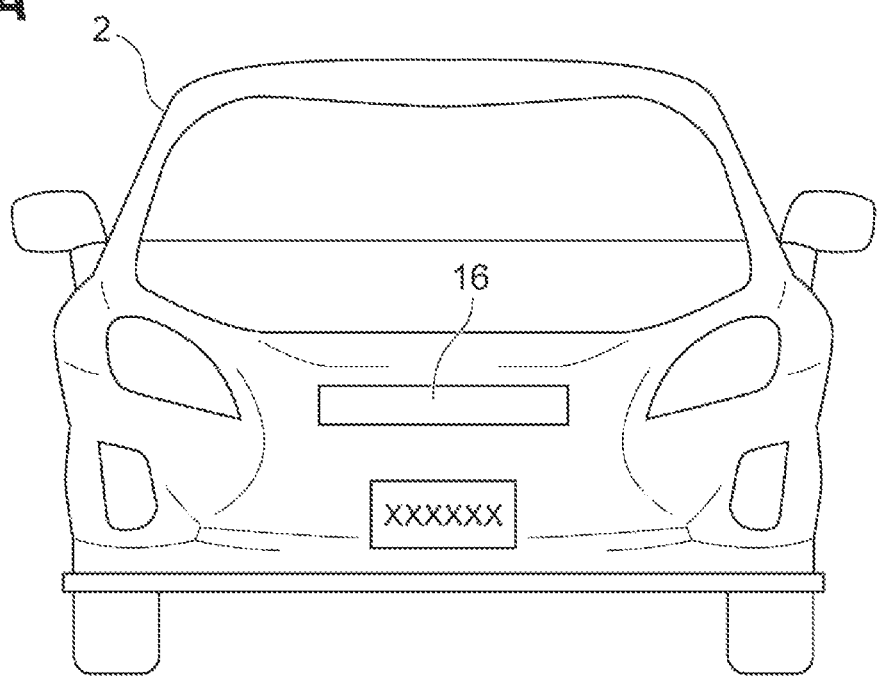
FIG. 3A is a view illustrating an example of an in-vehicle installation position of a display unit.
Figure 3B:
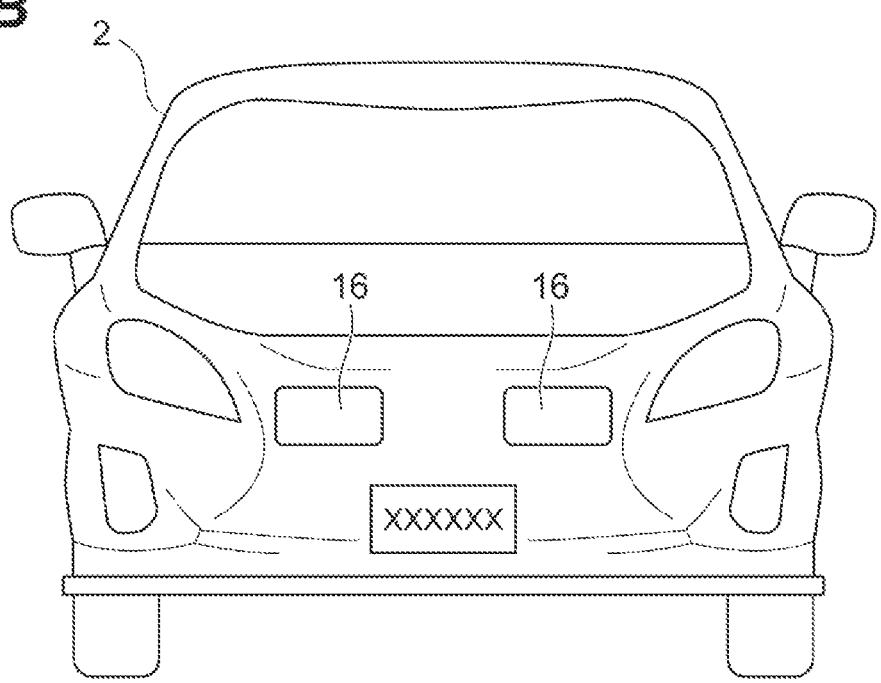
FIG. 3B is a view illustrating another example of the in-vehicle installation position of the display unit.

The display unit 16 is a light source device such as a lamp, for example. The display unit 16 is disposed at a position such that the display unit 16 can be visually recognized from a position in front of the vehicle 2. FIG. 3A is a view illustrating an example of the in-vehicle installation position of the display unit. As shown in FIG. 3A, one display unit 16 is provided in a grille portion on the front side of the vehicle 2. FIG. 3B is a view illustrating another example of the in-vehicle installation position of the display unit. As shown in FIG. 3B, two display units 16 are provided in the grille portion on the front side of the vehicle 2. As described above, one display unit 16 or a plurality of display units 16 is provided on the front side of the vehicle 2.

The notification ECU 10 can cause the display unit 16 to display various traveling states of the vehicle 2 by changing the lighting state of the display unit 16. For example, at the time of a deceleration state, the notification ECU 10 causes the display unit 16 to flicker (example of deceleration displaying operation). At the time of the stopped state, the notification ECU 10 causes the display unit 16 to continue to emit light (example of vehicle stoppage displaying operation) after stopping flickering. At the time of the movement starting state, the notification ECU 10 causes the display unit 16 to flicker at a cycle faster than light flickering at the time of the deceleration state (example of movement starting displaying operation). Alternatively, at the time of the deceleration state or the stopped state, the notification ECU 10 causes the display unit 16 to emit light of a color (safety color) such as blue or green that gives a person a sense of safety (example of deceleration displaying operation and vehicle stoppage displaying operation) and the notification ECU 10 causes the display unit 16 to emit light of an alert color such as red that makes a person cautious (example of movement starting displaying operation) at the time of the movement starting state. The notification ECU 10 may cause the display unit 16 to emit light by using a first safety color (example of deceleration displaying operation) and a second safety color (example of vehicle stoppage displaying operation) such that the deceleration state and the stopped state can be distinguished from each other. Alternatively, at the time of the deceleration state, the notification ECU 10 may cause the display unit 16 to flicker at a high luminance level (example of deceleration displaying operation). At the time of the stopped state, the notification ECU 10 may cause the display unit 16 to continue to emit light at a low luminance level after stopping flickering (example of vehicle stoppage displaying operation). At the time of the movement starting state, the notification ECU 10 may cause the display unit 16 to continue to emit light at a luminance level higher than the luminance level of light at the time of the deceleration state (example of movement starting displaying operation).

The notification ECU 10 is provided with a recognition unit 11, the determination unit 12, a calculation unit 13, a display controller 14 (example of notification controller), and a vehicle stoppage determination unit 15.

The recognition unit 11 recognizes, based on the result of detection performed by the external sensor 3, the position of a pedestrian in front of the roadway on which the vehicle 2 travels. The function of the recognition unit 11 may be the same as the above-described pedestrian recognition function of the autonomous driving ECU 8. The recognition unit 11 determines whether an object detected by the external sensor 3 is a pedestrian or not by using the pattern matching technique or the like.

The determination unit 12 determines whether the pedestrian is a soon-to-cross pedestrian based on a distance between the position of the pedestrian recognized by the recognition unit 11 and the road on which the vehicle 2 travels. The function of the determination unit 12 may be the same as the above-described pedestrian recognition function of the autonomous driving ECU 8. In an example shown in FIG. 2A, as with the autonomous driving ECU 8, the determination unit 12 determines that the pedestrian is the soon-to-cross pedestrian when the distance W is equal to or lower than a threshold value and determines that the pedestrian H is not the soon-to-cross pedestrian when the distance W is not equal to or lower than the threshold value. The determination unit 12 may determine whether the pedestrian is the soon-to-cross pedestrian in consideration of a direction in which the face of the pedestrian H faces and a direction in which the pedestrian H moves as well.

When the determination unit 12 determines that the pedestrian H is the soon-to-cross pedestrian, the calculation unit 13 calculates, based on the speed of the vehicle 2 during autonomous driving, the vehicle stoppage distance by which the vehicle 2 travels until the vehicle 2 enters the stopped state while performing autonomous driving. The function of the calculation unit 13 may be the same as the above-described vehicle stoppage distance calculation function of the autonomous driving ECU 8. As with the autonomous driving ECU 8, the calculation unit 13 can calculate, based on the vehicle speed measured by the internal sensor 5 and the braking performance of the vehicle 2, the vehicle stoppage distance by which the vehicle 2 travels from the current position until the vehicle 2 in a traveling state enters the stopped state, for example. The calculation unit 13 may acquire the braking performance of the vehicle 2 from specification information of the vehicle 2 or from the autonomous driving ECU 8.

The display controller 14 determines information based on the vehicle stoppage distance calculated by the calculation unit 13, the position of the vehicle 2, and the position of the soon-to-cross pedestrian and causes the display unit 16 to display the determined information. The vehicle stoppage determination unit 15 determines whether the vehicle 2 is in the stopped state. As with the autonomous driving ECU 8, the vehicle stoppage determination unit 15 determines that the vehicle 2 is in the stopped state when the vehicle speed measured by the internal sensor 5 is zero or falls in a predetermined range including zero.

Hereinafter, the display controller 14 will be described in detail. An operation performed by the display controller 14 when there is one soon-to-cross pedestrian and an operation performed by the display controller 14 when there is a plurality of soon-to-cross pedestrians are different from each other. Therefore, hereinafter, an example in which there is one soon-to-cross pedestrian and an example in which there is a plurality of soon-to-cross pedestrians will be described.

Figure 4:
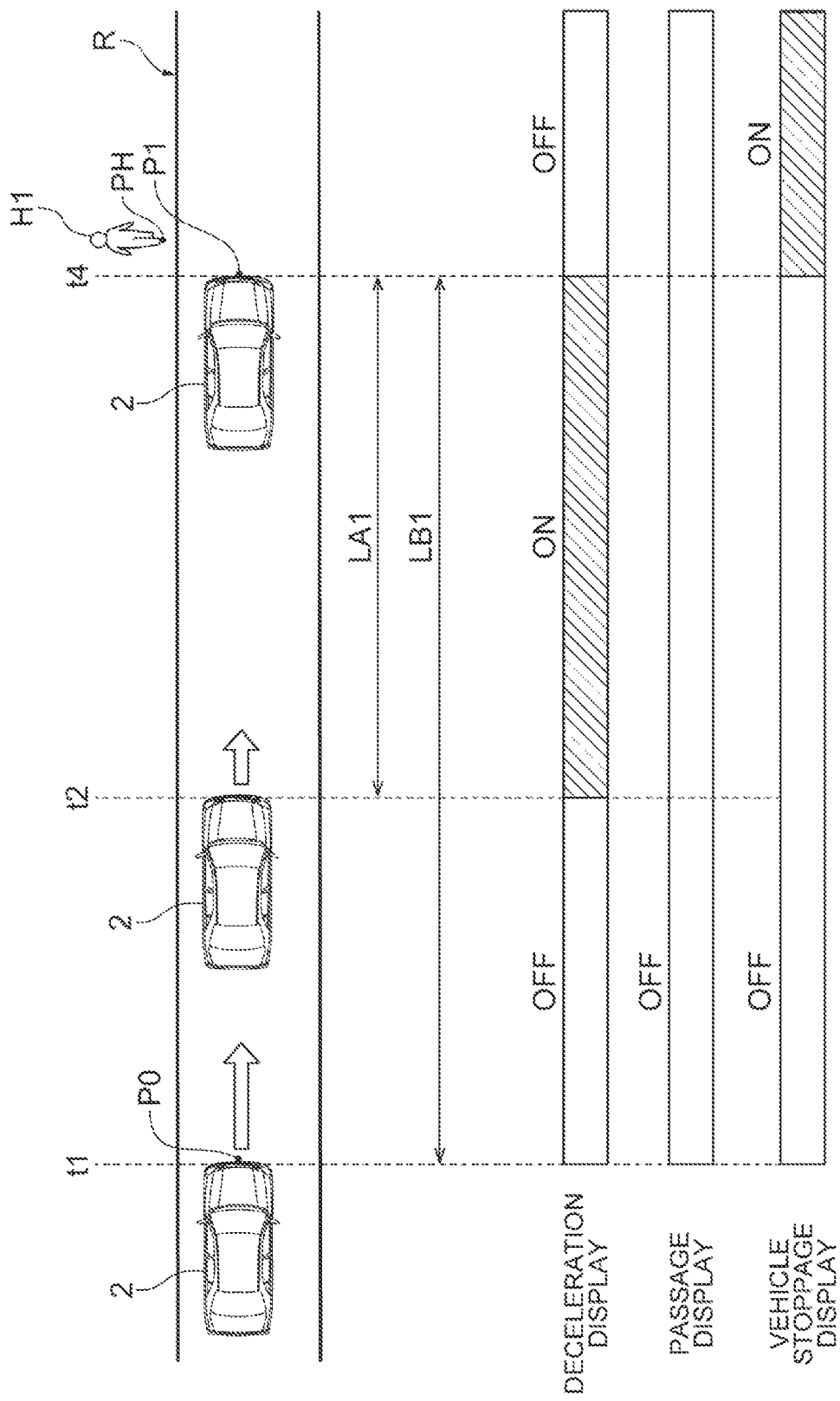
FIG. 4 is a view illustrating an example of an operation of switching between states of a displaying operation with respect to one soon-to-cross pedestrian.

FIG. 4 is a view illustrating an example of an operation of switching between states of a displaying operation with respect to one soon-to-cross pedestrian. In the example shown in FIG. 4, the vehicle 2 is traveling on the road R and the external sensor 3 has detected a moving object on the position PH which is in front of the vehicle 2, at a time t1. In addition, the recognition unit 11 has recognized that the moving object is a pedestrian, the determination unit 12 has determined that the pedestrian is the soon-to-cross pedestrian H1, and the calculation unit 13 has calculated a vehicle stoppage distance LA1. In this case, as with the autonomous driving ECU 8, the display controller 14 determines the position P1 on the road R which corresponds to the position PH of the soon-to-cross pedestrian H1. In addition, the display controller 14 calculates a pedestrian-to-vehicle distance LB1 which is a distance between the position P corresponding to the soon-to-cross pedestrian H1 and the current position P0 of the vehicle 2 (for example, position of vehicle head of vehicle 2).

In an example shown in FIG. 4, the pedestrian-to-vehicle distance LB1 is greater than the vehicle stoppage distance LA1. Therefore, the display controller 14 determines that the autonomous driving ECU 8 will stop the vehicle 2 before the vehicle 2 reaches the position P1 corresponding to the soon-to-cross pedestrian H1. That is, when the pedestrian-to-vehicle distance LB1 is equal to or greater than the vehicle stoppage distance LA1, the display controller 14 determines information indicating that the vehicle 2 is in the middle of deceleration as information to be displayed on the display unit 16. When the autonomous driving ECU 8 causes the vehicle 2 to start deceleration at a time t2, the display controller 14 causes the display unit 16 to display no information during a period between the time t1 and the time t2 (deceleration displaying operation is OFF, passage displaying operation is OFF, and vehicle stoppage displaying operation is OFF) and causes the display unit 16 to display the information indicating that the vehicle 2 is in the middle of deceleration (deceleration displaying operation is ON, passage displaying operation is OFF, and vehicle stoppage displaying operation is OFF) after the time t2. The display controller 14 may control the display unit 16 based on time by being operated in synchronization with the autonomous driving ECU 8 and may change the state of the deceleration displaying operation from an OFF state to an ON state after confirming that the vehicle 2 is in the middle of deceleration based on the result of detection performed by the internal sensor 5.

When the vehicle stoppage determination unit 15 determines that the vehicle 2 is in the stopped state, the display controller 14 changes information to be displayed on the display unit 16 from the information indicating that the vehicle 2 is in the middle of deceleration to information indicating that the vehicle 2 is in the stopped state. When the vehicle stoppage determination unit 15 determines that the vehicle 2 is in the stopped state at a time t4, the display controller 14 causes the display unit 16 to stop displaying the information indicating that the vehicle 2 is in the middle of deceleration at the time t4 and causes the display unit 16 to display the information indicating that the vehicle 2 is in the stopped state (deceleration displaying operation is ON, passage displaying operation is OFF, and vehicle stoppage displaying operation is OFF). Accordingly, the soon-to-cross pedestrian H1 can cross the road R after confirming a stoppage displaying operation.

Figure 5:
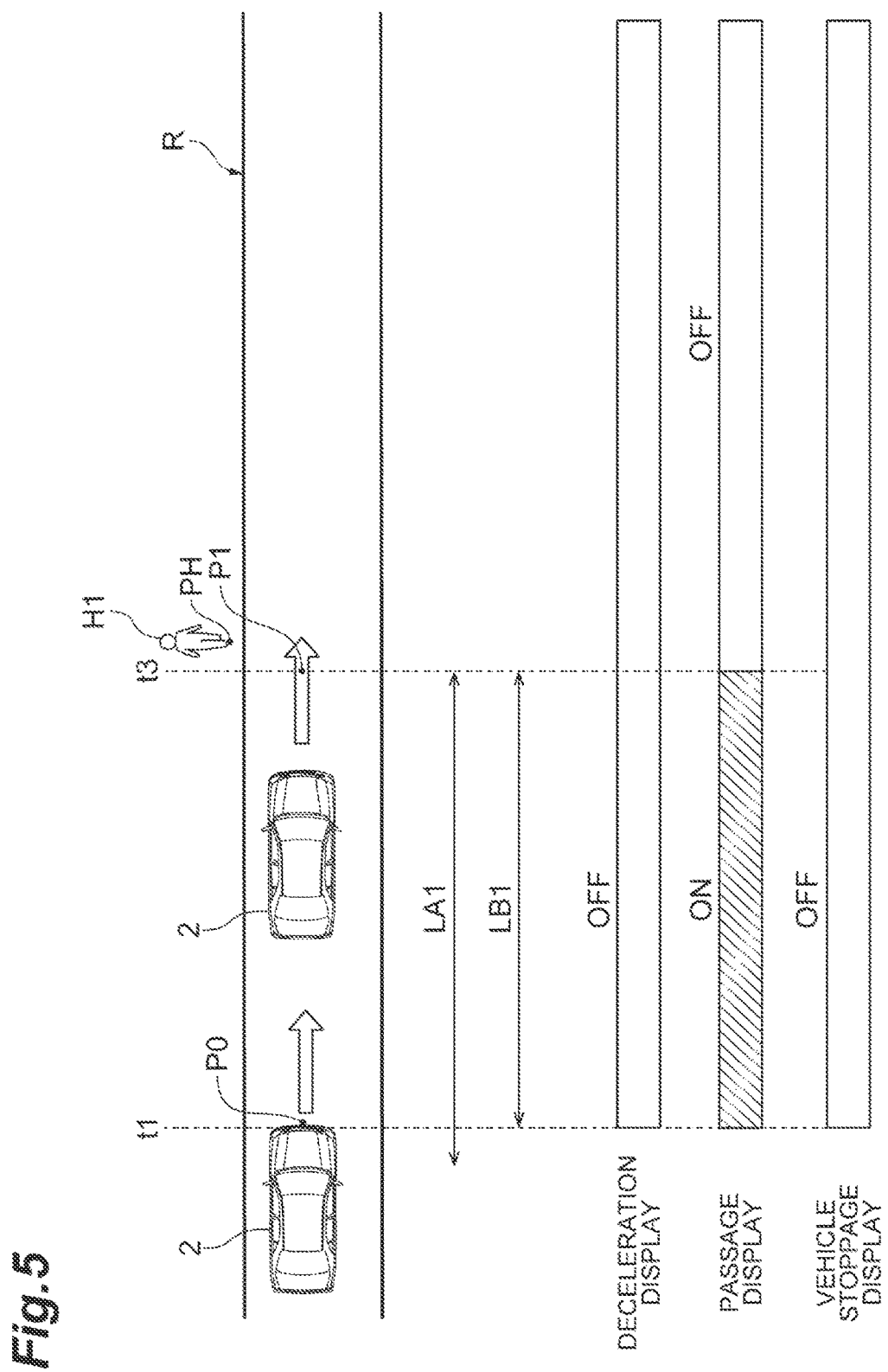
FIG. 5 is a view illustrating another example of an operation of switching between states of a displaying operation with respect to one soon-to-cross pedestrian.

FIG. 5 is a view illustrating another example of an operation of switching between states of a displaying operation with respect to one soon-to-cross pedestrian. In the example shown in FIG. 5, the vehicle 2 is traveling on the road R and the external sensor 3 has detected a moving object on the position PH which is in front of the vehicle 2, at the time t1. In addition, the recognition unit 11 has recognized that the moving object is a pedestrian, the determination unit 12 has determined that the pedestrian is the soon-to-cross pedestrian H1, and the calculation unit 13 has calculated the vehicle stoppage distance LA. In this case, as with the autonomous driving ECU 8, the display controller 14 determines the position P1 on the road R which corresponds to the position PH of the soon-to-cross pedestrian H1. In addition, the display controller 14 calculates the pedestrian-to-vehicle distance LB1 which is a distance between the position P1 corresponding to the soon-to-cross pedestrian H1 and the current position P0 of the vehicle 2 (for example, position of vehicle head of vehicle 2).

In an example shown in FIG. 5, the pedestrian-to-vehicle distance LB1 is smaller than the vehicle stoppage distance LA1. Therefore, the display controller 14 determines that the vehicle 2 will pass through the position P1 corresponding to the soon-to-cross pedestrian H1. That is, when the pedestrian-to-vehicle distance LB1 is smaller than the vehicle stoppage distance LA1, the display controller 14 determines information indicating that the vehicle 2 is passing by the pedestrian as information to be displayed by the display unit 16. When the vehicle 2 passes through the position P1 corresponding to the soon-to-cross pedestrian H1 at a time t3, the display controller 14 causes the display unit 16 to display information indicating that the vehicle 2 is passing by the pedestrian during a period between the time t1 and the time t3 (deceleration displaying operation is OFF, passage displaying operation is ON, and vehicle stoppage displaying operation is OFF) and causes the display unit 16 to stop displaying the information indicating that the vehicle 2 is passing by the pedestrian (deceleration displaying operation is OFF, passage displaying operation is OFF, and vehicle stoppage displaying operation is OFF) after the time t3. Accordingly, the soon-to-cross pedestrian H1 can understand that the vehicle 2 will not stop in front of the soon-to-cross pedestrian H1.

Figure 6:
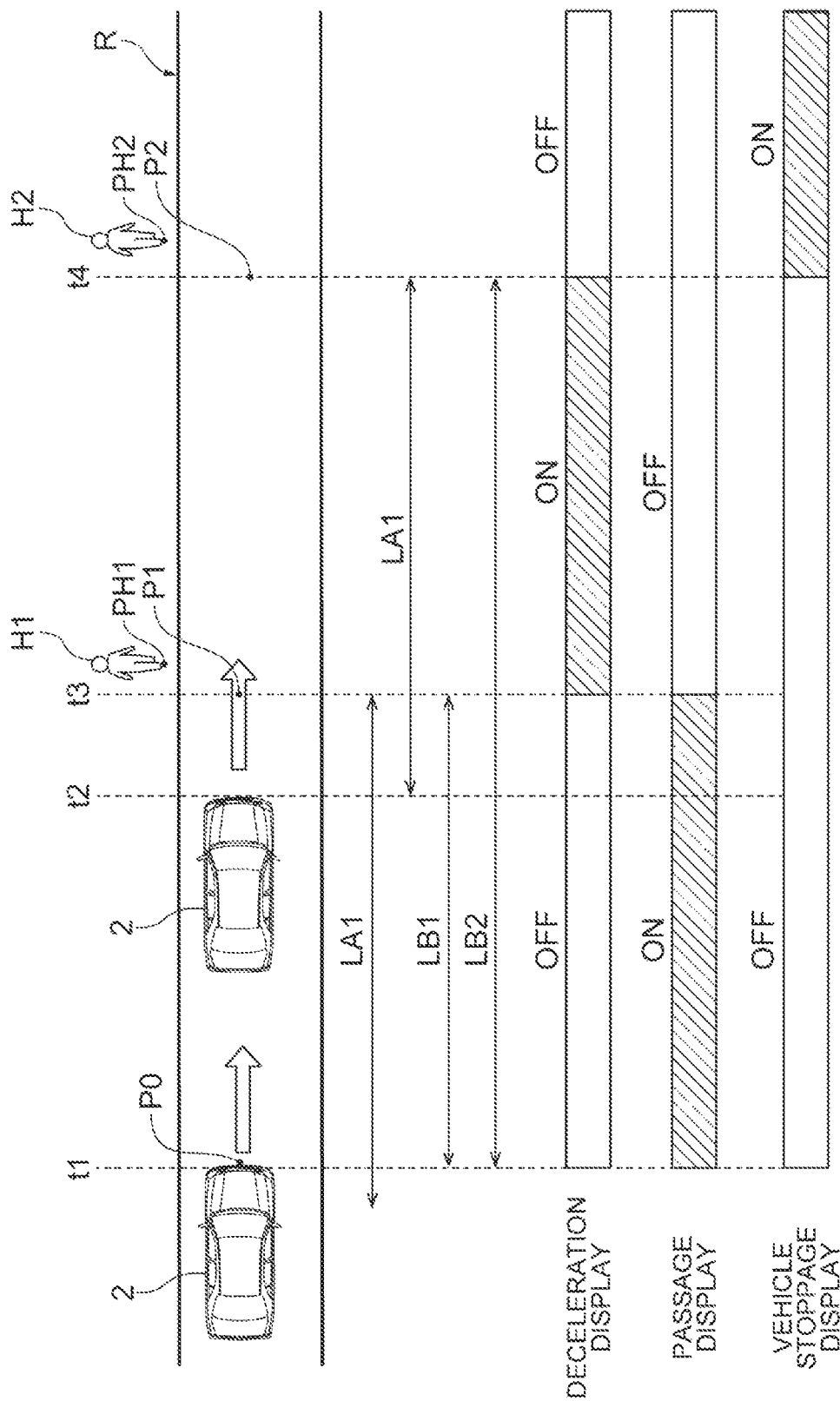
FIG. 6 is a view illustrating an example of an operation of switching between states of a displaying operation with respect to a plurality of soon-to-cross pedestrians.

FIG. 6 is a view illustrating an example of an operation of switching between states of a displaying operation with respect to a plurality of soon-to-cross pedestrians. In the example shown in FIG. 6, the vehicle 2 is traveling on the road R and the external sensor 3 has detected moving objects on a position PH1 and a position PH2 which are in front of the vehicle 2, at the time t1. In addition, the recognition unit 11 has recognized that the moving objects are pedestrians and the determination unit 12 has determined that the pedestrians are the first soon-to-cross pedestrian H1 and a second soon-to-cross pedestrian H2. The second soon-to-cross pedestrian H2 is positioned ahead of the first soon-to-cross pedestrian in the proceeding direction of the vehicle 2. In addition, the calculation unit 13 has calculated the vehicle stoppage distance LA1. In this case, the display controller 14 determines the position P1 on the road R which corresponds to the position PH1 of the first soon-to-cross pedestrian H1. Furthermore, the display controller 14 determines a position P2 on the road R which corresponds to the position PH2 of the second soon-to-cross pedestrian H2. In addition, the display controller 14 calculates the first pedestrian-to-vehicle distance LB1 which is a distance between the position P1 corresponding to the first soon-to-cross pedestrian H1 and the current position P0 of the vehicle 2 (for example, position of vehicle head of vehicle 2). In addition, the display controller 14 calculates a second pedestrian-to-vehicle distance LB2 which is a distance between the position P2 corresponding to the second soon-to-cross pedestrian H2 and the current position P0 of the vehicle 2 (for example, position of vehicle head of vehicle 2).

In the example shown in FIG. 6, the first pedestrian-to-vehicle distance LB1 is smaller than the vehicle stoppage distance LA1, and the second pedestrian-to-vehicle distance LB2 is greater than the vehicle stoppage distance LA1. Accordingly, the display controller 14 determines that the vehicle 2 passes through the position P1 corresponding to the first soon-to-cross pedestrian H1 and the vehicle 2 stops before reaching the position P2 corresponding to the second soon-to-cross pedestrian H2. In other words, the vehicle 2 starts deceleration at the time t2, passes through the position P1 corresponding to the first soon-to-cross pedestrian H1 at the time t3, and stops at the position p2 corresponding to the second soon-to-cross pedestrian H2 at the time t4.

When the first pedestrian-to-vehicle distance LB1 is smaller than the vehicle stoppage distance LA1 and the second pedestrian-to-vehicle distance LB2 is equal to or greater than the vehicle stoppage distance LA1, the display controller 14 does not cause the display unit 16 to display the information indicating that the vehicle 2 is in the middle of deceleration before the vehicle 2 passes by the first soon-to-cross pedestrian H1. In other words, during a period between the time t2 and the time t3, the information indicating that the vehicle 2 is in the middle of deceleration is not displayed on the display unit 16 although the vehicle 2 is in the middle of deceleration (deceleration displaying operation is OFF). In addition, the display controller 14 causes the display unit 16 to display the information indicating that the vehicle 2 is in the middle of deceleration after the vehicle 2 passes by the first soon-to-cross pedestrian H1 (that is, after time t3) (deceleration displaying operation is ON). Accordingly, based on display on the display unit 16, the first soon-to-cross pedestrian H1 can avoid erroneously recognizing that the vehicle 2 will stop in front of the first soon-to-cross pedestrian H1.

The display controller 14 may cause the display unit 16 to display information indicating that the vehicle 2 is passing by the pedestrian during a period between the time t2 and the time t3 in which the deceleration displaying operation is OFF or a period between the time t1 and the time t2, which is earlier than the period between the time t2 and the time t3 (passage displaying operation is ON). Accordingly, it is possible to notify the first soon-to-cross pedestrian H1 seeing the display unit 16 that the vehicle 2 will pass by the first soon-to-cross pedestrian H1.

The operation of the display controller 14 at the time t4 is the same as illustrated in FIG. 4. The display controller 14 causes the display unit 16 to stop displaying the information indicating that the vehicle 2 is in the middle of deceleration and causes the display unit 16 to display the information indicating that the vehicle 2 is in the stopped state (deceleration displaying operation is ON, passage displaying operation is OFF, and vehicle stoppage displaying operation is OFF).

Operation of Notification Device

Figure 7:
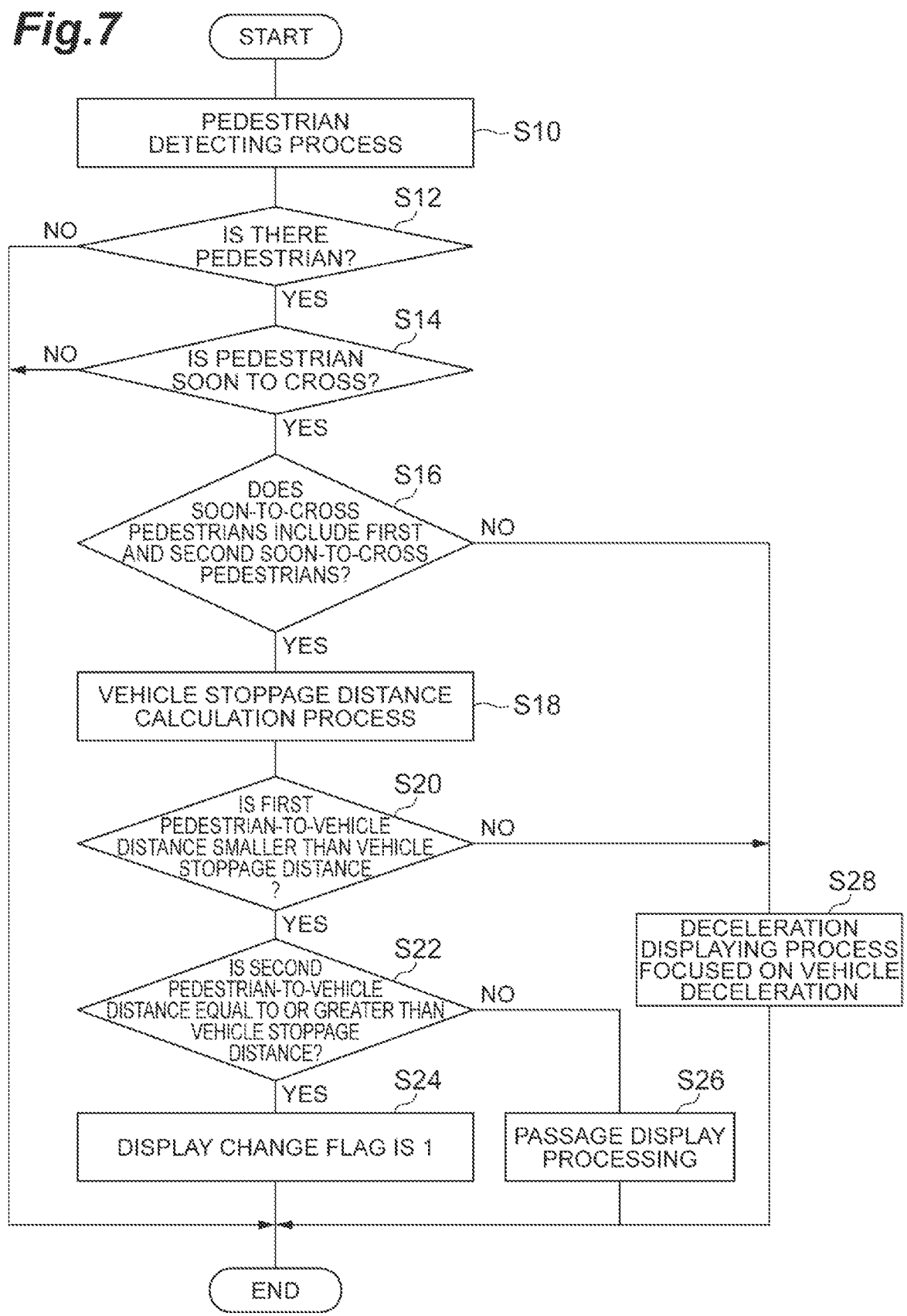
FIG. 7 is a flowchart illustrating an example of the operation of the notification device.
Figure 8:
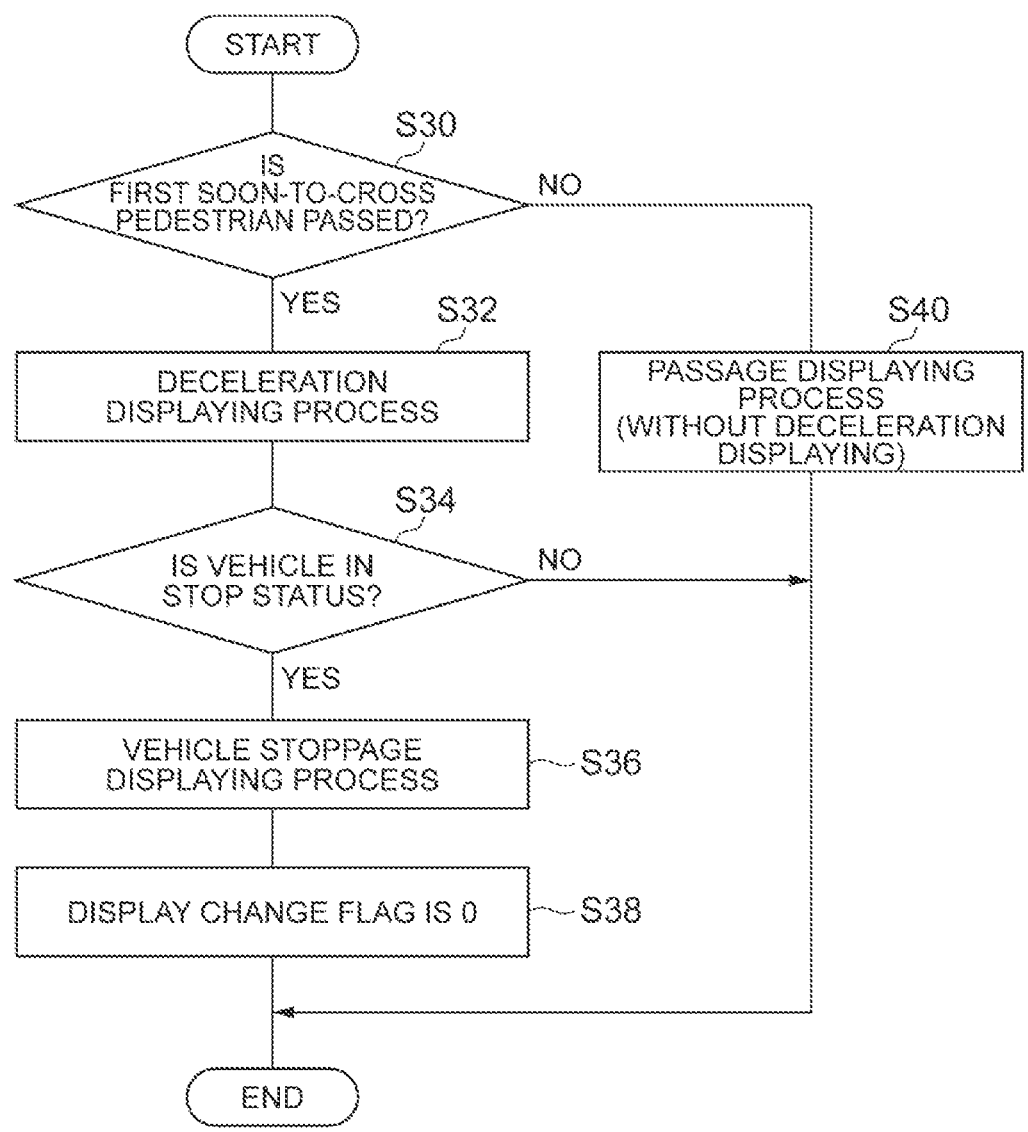
FIG. 8 is a flowchart illustrating an example of the operation of the notification device.

FIGS. 7 and 8 are flowcharts illustrating an example of the operation of the notification device. A process as in the flowchart shown in FIG. 7 is performed by the notification ECU 10 of the notification device 1. The notification ECU 10 starts the process as in the flowchart shown in FIG. 7 at a time when the autonomous driving ECU 8 starts the autonomous driving.

As illustrated in FIG. 7, the recognition unit 11 of the notification ECU 10 recognizes whether an object in front of the vehicle 2 that is detected by the external sensor 3 is a pedestrian or not as a pedestrian detecting process (S10). When the detected object is a pedestrian, the recognition unit 11 recognizes the position of the pedestrian. Then, the display controller 14 of the notification ECU 10 determines whether there is an object recognized as a pedestrian in the pedestrian detecting process (S10), as a pedestrian determination process (S12). When the display controller 14 determines that there is an object recognized as a pedestrian (S12: YES), the process proceeds to a soon-to-cross pedestrian determination process (S14).

The determination unit 12 of the notification ECU 10 determines whether the pedestrian recognized in the pedestrian detecting process (S10) is a soon-to-cross pedestrian or not, as the soon-to-cross pedestrian determination process (S14). The determination unit 12 determines whether the pedestrian is the soon-to-cross pedestrian or not based on the distance W between the position PH of the pedestrian H and the road R on which the vehicle 2 travels (FIG. 2A).

When the determination unit 12 determines that the pedestrian is the soon-to-cross pedestrian (S14: YES), the display controller 14 determines whether the soon-to-cross pedestrians include first and second soon-to-cross pedestrians as a plurality determination (S16). When the display controller 14 determines that the soon-to-cross pedestrians include first and second soon-to-cross pedestrians as a plurality determination (S16: YES), the calculation unit 13 of the notification ECU 10 calculates, based on the speed of the vehicle 2 during autonomous driving, the vehicle stoppage distance LA1 by which the vehicle 2 travels until the vehicle 2 enters the stopped state while performing autonomous driving (FIG. 6) as a vehicle stoppage distance calculation process (S18).

Next, the display controller 14 determines whether the first pedestrian-to-vehicle distance LB1, which is a distance between the first soon-to-cross pedestrian H1 and the vehicle 2 is smaller than the vehicle stoppage distance LA1 as a first pedestrian-to-vehicle determination process (S20) (FIG. 6). When the display controller 14 determines that the first pedestrian-to-vehicle distance LB1 is smaller than the vehicle stoppage distance LA1 (S20: YES), the vehicle 2 cannot enter the stopped state at the position P1 corresponding to the first soon-to-cross pedestrian H1. In this case, the display controller 14 determines whether the second pedestrian-to-vehicle distance LB2, which is a distance between the second soon-to-cross pedestrian H2 and the vehicle 2, is equal to or greater than the vehicle stoppage distance LA1 or not as a second pedestrian-to-vehicle determination process (S22) (FIG. 6). When the display controller 14 determines that the second pedestrian-to-vehicle distance LB2 is equal to or greater than the vehicle stoppage distance LA1 (S22: YES), the vehicle 2 can enter the stopped state at the position P2 corresponding to the second soon-to-cross pedestrian 12. In this case, the display controller 14 sets a display change flag to [1] from [0] (initial value) as a flag ON process (S24). The display change flag is a flag for determining whether to perform a process as in the flowchart shown in FIG. 8. As described above, when the vehicle 2 cannot enter the stopped state at the position P1 corresponding to the first soon-to-cross pedestrian H1 and can enter the stopped state at the position P2 corresponding to the second soon-to-cross pedestrian H2, the display controller 14 determines that the display state needs to be adjusted such that the first soon-to-cross pedestrian H1 does not misunderstand and sets the display change flag to [1].

When the display controller 14 determines that the soon-to-cross pedestrians do not include the first and second soon-to-cross pedestrians (S16: NO), there is no other soon-to-cross pedestrian than the first soon-to-cross pedestrian H1. In this case, the display controller 14 performs a deceleration displaying process in accordance with deceleration of the vehicle, as a display control process (S28). When the vehicle 2 can enter the stopped state at the position P1 corresponding to the first soon-to-cross pedestrian H1, the display controller 14 causes the display unit 16 to display the information indicating that the vehicle 2 is in the middle of deceleration in accordance with deceleration of the vehicle 2 (FIG. 4). When the vehicle 2 cannot enter the stopped state at the position P1 corresponding to the first soon-to-cross pedestrian H1, the display controller 14 causes the display unit 16 not to display the information indicating that the vehicle 2 is in the middle of deceleration in accordance with deceleration of the vehicle 2 or causes the display unit 16 to display the information indicating that the vehicle 2 will pass the pedestrian (FIG. 5).

In addition, when the display controller 14 determines that the first pedestrian-to-vehicle distance LB1 is not smaller than the vehicle stoppage distance LA1 (S20: NO), the vehicle 2 can enter the stopped state at the position P1 corresponding to the first soon-to-cross pedestrian H1 although there is a soon-to-cross pedestrian other than the first soon-to-cross pedestrian H1. Therefore, the display controller 14 performs the deceleration displaying process in accordance with the deceleration of the vehicle, as the display control process (S28). The display controller 14 causes the display unit 16 to display information indicating that the vehicle 2 is in the middle of deceleration in accordance with deceleration of the vehicle 2 (FIG. 4).

When the display controller 14 determines that the second pedestrian-to-vehicle distance LB2 is not equal to or greater than the vehicle stoppage distance LA1 (S22: NO), the vehicle 2 cannot enter the stopped state at any of the position P1 corresponding to the first soon-to-cross pedestrian H1 and the position P2 corresponding to the second soon-to-cross pedestrian H2. Therefore, the display controller 14 causes the display unit 16 to display the information indicating that the vehicle 2 will pass the pedestrian, as a passage displaying process (S26).

When the display controller 14 determines that there is no object recognized as a pedestrian (S12: NO), when the determination unit 12 determines that the pedestrian is not the soon-to-cross pedestrian (S14: NO), when the flag ON process (S24) is finished, when the passage displaying process (S26) is finished, or when the display control process (S28) is finished, the process as in the flowchart shown in FIG. 7 is terminated. The notification ECU 10 starts the process as in the flowchart from the beginning when a termination condition is not satisfied and the process as in the flowchart shown in FIG. 7 is terminated. Examples of the termination condition includes a condition that the autonomous driving is finished or a condition that a process stopping instruction is issued by a user.

A process as in the flowchart shown in FIG. 8 is performed by the notification ECU 10 of the notification device 1. The notification ECU 10 starts the process when the display change flag is set to [1] in the flag ON process (S24) in FIG. 7.

The display controller 14 of the notification ECU 10 determines whether the vehicle 2 has passed through the position P1 corresponding to the first soon-to-cross pedestrian H1, as passage determination (S30). The display controller 14 determines whether the vehicle 2 has passed through the position P1 or not based on the result of detection performed by the external sensor 3, for example. When the display controller 14 determines that the vehicle 2 has not passed through the position P1 corresponding to the first soon-to-cross pedestrian H1 (S30: NO), the display controller 14 causes the display unit 16 to display the information indicating that the vehicle 2 will pass by the pedestrian and causes the display unit 16 not to display the information indicating that the vehicle 2 is in the middle of deceleration, as the passage displaying process (S40) (FIG. 6). When the passage displaying process (S40) is finished, the process as in the flowchart shown in FIG. 8 is terminated. At this time, since the display change flag remains [1] and thus the display controller 14 performs the process as in the flowchart shown in FIG. 8 from the beginning. As described above, the display controller 14 causes the display unit 16 to display the information indicating passage of the vehicle 2 until the vehicle 2 passes by the first soon-to-cross pedestrian H1 and causes the display unit 16 not to display the information indicating that the vehicle 2 is in the middle of deceleration until the vehicle 2 passes by the first soon-to-cross pedestrian H1.

When the display controller 14 determines that the vehicle 2 has passed through the position P1 corresponding to the first soon-to-cross pedestrian H1 (S30: YES), the display controller 14 causes the display unit 16 to display the information indicating that the vehicle 2 is in the middle of deceleration, as the deceleration displaying process (S32) (FIG. 6). As described above, the display controller 14 causes the display unit 16 to display the information indicating that the vehicle 2 is in the middle of deceleration after the vehicle 2 passes by the first soon-to-cross pedestrian H1.

Next, the vehicle stoppage determination unit 15 of the notification ECU 10 determines whether the vehicle 2 is in the stopped state, as a vehicle stoppage determination process (S34). When the vehicle stoppage determination unit 15 determines that the vehicle 2 is not in the stopped state (S34: NO), the process as in the flowchart shown in FIG. 8 is terminated. At this time, since the display change flag remains [1] and thus the display controller 14 performs the process as in the flowchart shown in FIG. 8 from the beginning. That is, the display controller 14 repeats the deceleration displaying process (S32) until the vehicle 2 enters the stopped state.

When the vehicle stoppage determination unit 15 determines that the vehicle 2 is in the stopped state (S34: YES), the display controller 14 changes information to be displayed by the display unit 16 from the information indicating that the vehicle 2 is in the middle of deceleration to the information indicating that the vehicle 2 is in the stopped state, as a vehicle stoppage displaying process (S36). Next, the display controller 14 sets the display change flag to [0] from [1] as a flag OFF process (S38). When the flag OFF process (S38) is finished, the process as in the flowchart shown in FIG. 8 is terminated. At this time, since the display change flag is [0], the display controller 14 do not repeats the process as in the flowchart shown in FIG. 8.

In the case of the notification device 1 as described above, when the first pedestrian-to-vehicle distance LB1 (distance between vehicle 2 and first soon-to-cross pedestrian H1) is smaller than the vehicle stoppage distance LA1 and the second pedestrian-to-vehicle distance LB2 (distance between vehicle 2 and second soon-to-cross pedestrian H2) is equal to or greater than the vehicle stoppage distance LA1, notification with respect to the outside of the vehicle is not performed by means of the deceleration displaying operation (information indicating that vehicle 2 is in middle of deceleration) until the vehicle 2 passes by the first soon-to-cross pedestrian H1 and notification is performed by means of the deceleration displaying operation after the vehicle 2 passes by the first soon-to-cross pedestrian H1. As described above, the vehicle 2 do not start notification by means of the deceleration displaying operation at a position in front of the first soon-to-cross pedestrian H1 at which the vehicle 2 will not stop. Therefore, the first soon-to-cross pedestrian H1 can avoid erroneously recognizing that the vehicle 2 will stop in front of the first soon-to-cross pedestrian H1. In addition, after the vehicle 2 passes by the first soon-to-cross pedestrian H1, notification is performed by means of the deceleration displaying operation. Therefore, correct information indicating that the vehicle will stop in front of the second soon-to-cross pedestrian can be appropriately provided to the second soon-to-cross pedestrian H2. Accordingly, with the notification device 1, it is possible to perform notification without confusing any one of the first soon-to-cross pedestrian H1 and the second soon-to-cross pedestrian H2.

In the case of the notification device 1, notification with the passage displaying operation is performed with respect to the first soon-to-cross pedestrian H1, who is not the target of notification with the deceleration displaying operation. Therefore, the first soon-to-cross pedestrian H1 is appropriately notified of a future behavior of the vehicle 2, that is, a behavior of passing by the first soon-to-cross pedestrian H1 without stopping in front of the first soon-to-cross pedestrian H1. Therefore, with the notification device 1, it is possible to avoid confusing the first soon-to-cross pedestrian H1.

In the case of the notification device 1, when a determination is made that the vehicle 2 is in the stopped state, information is changed from the deceleration displaying operation to the vehicle stoppage displaying operation. Therefore, it is possible for a pedestrian to clearly distinguish between a state where the vehicle is in the middle of deceleration and a state where the vehicle is in the stopped state.

Hereinabove, various exemplary embodiments have been described. However, the disclosure is not limited to the above-described exemplary embodiments and various omissions, substitutions, and modifications may be made.

For example, the display unit 16 do not need to be provided outside the vehicle 2 and the display unit 16 may be provided at a position inside the vehicle such as a position inward of the windshield as long as it is possible to perform notification about information with respect to the outside of the vehicle. In addition, the display unit 16 is not limited to a lamp and may be a display device. The point is that the display unit 16 may be any device emitting light. When a display device is adopted as the display unit 16, the notification device 1 may express deceleration, vehicle stoppage, and movement start using letters instead of light. The notification device 1 has the same effect as the above described exemplary embodiments even when notification is performed with letter information. In addition, for the notification device 1, a speaker outputting a sound may be used instead of the display unit 16. The notification device 1 may use a pseudo engine sound as a notification sound. The notification device 1 has the same effect as the above described exemplary embodiments even when notification is performed with sound information.

The functions of the recognition unit 11, the determination unit 12, and the calculation unit 13 overlap with that of the autonomous driving ECU 8. Therefore, a configuration in which the result of calculation performed by the autonomous driving ECU 8 is acquired by the notification ECU 10 may also be adopted. That is, a part of the functions of the autonomous driving ECU 8 and the display controller 14 may constitute the notification device 1.

The vehicle stoppage distance calculation process (S18) in FIG. 7 may be performed at any time between the start of the process in FIG. 7 and the first pedestrian-to-vehicle determination process (S20). In the passage displaying process (S40) in FIG. 8, the passage displaying operation may be omitted. In addition, the notification device 1 may not be provided with the vehicle stoppage determination unit 15.

What is claimed is:

1. A notification device provided in a vehicle performing autonomous driving and configured to notify pedestrians of information, the device comprising:
    an electronic control unit configured to:
        recognize, based on a result of detection performed by an external sensor, positions of the pedestrians in front of a roadway on which the vehicle travels;
        determine, based on a distance between the positions of the pedestrians recognized by the electronic control unit and a road on which the vehicle travels, whether the pedestrians are soon-to-cross pedestrians;
        calculate, based on a speed of the vehicle during autonomous driving, a vehicle stoppage distance by which the vehicle travels until the vehicle enters a stopped state while performing autonomous driving when the electronic control unit determines that the pedestrians are the soon-to-cross pedestrians; and
        determine the information based on the vehicle stoppage distance calculated by the electronic control unit, a position of the vehicle, and the positions of the soon-to-cross pedestrians and to cause a display unit to perform notification about the determined information; and
    the display unit provided in the vehicle and configured to perform notification about the information with respect to an outside of the vehicle; and
    wherein the soon-to-cross pedestrians include a first soon-to-cross pedestrian and a second soon-to-cross pedestrian positioned ahead of the first soon-to-cross pedestrian in a proceeding direction of the vehicle, and
    the electronic control unit is configured to cause the display unit not to perform notification about information indicating that the vehicle is in the middle of deceleration until the vehicle passes by the first soon-to-cross pedestrian and to cause the display unit to perform notification about information indicating that the vehicle is in the middle of deceleration after the vehicle passes by the first soon-to-cross pedestrian when a distance between the vehicle and the first soon-to-cross pedestrian is smaller than the vehicle stoppage distance and a distance between the vehicle and the second soon-to-cross pedestrian is equal to or greater than the vehicle stoppage distance.

2. The notification device according to claim 1,
    wherein the electronic control unit is configured to cause the display unit to perform notification about information indicating passage of the vehicle until the vehicle passes by the first soon-to-cross pedestrian.

3. The notification device according to claim 1, wherein the electronic control unit is configured to:
    determine whether the vehicle is in a stopped state, and change information, about which the display unit performs notification, from information indicating that the vehicle is in the middle of deceleration to information indicating that the vehicle is in the stopped state when the electronic control unit determines that the vehicle is in the stopped state.

4. The notification device according to claim 1,
wherein the display unit is configured to display the information as notification about the information, and
the electronic control unit is configured to control a displaying operation of the display unit.

\* \* \* \* \*

UNITED STATES PATENT AND TRADEMARK OFFICE
CERTIFICATE OF CORRECTION

PATENT NO. : 10,857,939 B2
APPLICATION NO. : 16/594511
DATED : December 8, 2020
INVENTOR(S) : Junichi Morimura It is certified that error appears in the above-identified patent and that said Letters Patent is hereby corrected as shown below:

On the Title Page

Item (71), Applicant 1, city, delete "Toyota" and insert --Toyota-shi Aichi-ken--, therefor.

Item (72), inventor 1, city, delete "Shizuoka-ken" and insert --Sunto-gun, Shizuoka-ken--, therefor.

Item (73), Assignee, city, delete "Toyota" and insert --Toyota-shi Aichi-ken--, therefor.

In the Specification

In Column 11, Line(s) 21, after "position", delete "P" and insert --P1--, therefor.

In Column 12, Line(s) 13, after "distance", delete "LA" and insert --LA1--, therefor.

In Column 14, Line(s) 59, after "pedestrian", delete "12" and insert --H2--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*